United States Patent
Masciambruni

(10) Patent No.: US 8,754,006 B2
(45) Date of Patent: *Jun. 17, 2014

(54) PACKAGING MATERIAL FOR A PHARMACEUTICAL PRODUCT HAVING A COLOURED ELEMENT WHICH AT A PREDETERMINED TEMPERATURE DISCOLOURS PARTIALLY, REVEALING A MARKING, AND METHOD FOR PRODUCING THIS MATERIAL

(75) Inventor: Roberto Masciambruni, Pescara (IT)

(73) Assignee: Aziende Chimiche Riunite Angelini Francesco A.C.R.A.F. S.p.A., Rome (IT)

( * ) Notice: Subject to any disclaimer, the term of this patent is extended or adjusted under 35 U.S.C. 154(b) by 194 days.

This patent is subject to a terminal disclaimer.

(21) Appl. No.: 13/127,870

(22) PCT Filed: Nov. 13, 2009

(86) PCT No.: PCT/EP2009/065113
§ 371 (c)(1),
(2), (4) Date: May 25, 2011

(87) PCT Pub. No.: WO2010/060813
PCT Pub. Date: Jun. 3, 2010

(65) Prior Publication Data
US 2011/0217487 A1 Sep. 8, 2011

(30) Foreign Application Priority Data
Nov. 25, 2008 (EP) .................................... 08425748

(51) Int. Cl.
*B41M 3/00* (2006.01)
*B41M 3/14* (2006.01)
*B41M 5/30* (2006.01)
*A61J 1/18* (2006.01)
*B05D 1/36* (2006.01)
*B65D 79/02* (2006.01)

(52) U.S. Cl.
USPC .......................... 503/206; 206/459.1; 427/258

(58) Field of Classification Search
CPC ............ A61J 1/18; B05D 1/36; B41M 3/005; B41M 3/30; B41M 5/30; B65D 79/02; G01N 31/229; G09F 3/0291
USPC .......................... 503/206; 206/459.1; 427/258
See application file for complete search history.

(56) References Cited

U.S. PATENT DOCUMENTS

| 4,385,844 A | 5/1983 | Fergason |
| 5,591,255 A | 1/1997 | Small et al. |

(Continued)

FOREIGN PATENT DOCUMENTS

WO WO 2007/115662 * 10/2007

OTHER PUBLICATIONS

U.S. Appl. No. 13/127,107, filed Jun. 30, 2011, Masciambruni.

(Continued)

*Primary Examiner* — Bruce H Hess
(74) *Attorney, Agent, or Firm* — Oblon, Spivak, McClelland, Maier & Neustadt, L.L.P.

(57) ABSTRACT

It is disclosed a packaging material for a pharmaceutical product. The packaging material comprises a colored element which at about 38° C. discolors partially, revealing a marking. The element is formed by a first portion forming the marking printed with conventional ink, and a second portion printed with thermochromic ink. The thermochromic ink is colored below about 38° C. and becomes colorless when this temperature is reached or exceeded. The two portions are arranged so that the first portion is invisible below about 38° C., but becomes visible when this temperature is reached or exceeded.

11 Claims, 2 Drawing Sheets

(56) References Cited

U.S. PATENT DOCUMENTS

| | | |
|---|---|---|
| 5,997,849 A | 12/1999 | Small et al. |
| 2006/0241355 A1 | 10/2006 | Howell et al. |
| 2006/0248946 A1 | 11/2006 | Howell et al. |
| 2007/0024465 A1 | 2/2007 | Howell et al. |
| 2007/0171506 A1 | 7/2007 | Jordan et al. |
| 2008/0086103 A1 | 4/2008 | McKiernan et al. |

OTHER PUBLICATIONS

International Search Report Issued Mar. 10, 2010 in PCT/EP09/065113 filed Nov. 13, 2009.

* cited by examiner

PACKAGING MATERIAL FOR A PHARMACEUTICAL PRODUCT HAVING A COLOURED ELEMENT WHICH AT A PREDETERMINED TEMPERATURE DISCOLOURS PARTIALLY, REVEALING A MARKING, AND METHOD FOR PRODUCING THIS MATERIAL

TECHNICAL FIELD

The present invention relates to a packaging material for a pharmaceutical product, and to a method for producing such packaging material.

BACKGROUND ART

The existence of pharmaceutical products capable of reducing the fever is known. Said pharmaceutical products are also known under the name of antipyretics. Typical antipyretic drugs are paracetamol, acetylsalicylic acid, niflumic acid, nimesulide, ketoprofen, flurbiprofen and some derivatives thereof.

The existence of substances able to change colour at a predetermined temperature is also known. Said substances are referred to as being "thermochromic". Generally, said substances form part of the category of liquid crystals.

During the last few decades numerous inks based on thermochromic substances have been investigated. These inks are called "thermochromic inks" and are used for silk-screen printing, flexographic printing, wet offset printing, lithographic printing and the like.

Some of these inks are coloured and change colour at a predetermined temperature. Other thermochromic inks are colourless and become coloured at a predetermined temperature. There are also other inks which are coloured and become colourless at a predetermined temperature.

US 2006/0241355 discloses a healthcare base including an area to receive a bottle that carries a health-related substance for the user to take. The bottle can be provided with a thermometer obtained with a thermochromic paint. The temperature sensor includes a series of dots arranged in an array with two axes. One axis is in one degree interval, and the other is in 0.2 degree interval. To use the thermometer, the user can hold the bottle against his/her forehead for a duration of time. Then, the user pulls the bottle away from the forehead to read the temperature.

SUMMARY OF THE INVENTION

The inventor has noticed that the bottle with the thermometer disclosed by US 2006/0241355 is not comfortable and discrete to use. Indeed, for measuring the temperature, the patient/user should hold the thermometer (i.e. the bottle) against a skin surface allowing each dot of the array to contact the patient's body (e.g. the forehead). However, holding a bottle against one's forehead is a pose that attracts attention and, in some situations (e.g. during travel, in the office, etc.), the patient/user may prefer not to perform it.

The inventor realised that it would be useful that a packaging of an antipyretic drug is equipped with an element capable of indicating to the patient/user, in a simpler and more discrete way, if she/he has a fever and therefore if she/he needs to be administered with the drug, even without having the precise measurement of her/his temperature. This would be useful especially when the patient/user has not a thermometer at his disposal. Indeed, the patient/user may first use the package for verifying if she/he has a fever and then (for instance, when she/he goes home) use a thermometer for measuring his/her temperature.

Moreover, the inventor has noticed that hitherto the technology of thermochromic inks has not been widely adopted because it has a number of disadvantages of varying gravity depending on the characteristics of the thermochromic ink used.

In particular, the inventor realised that those thermochromic inks which are coloured below their transition temperature and become colourless when said temperature is reached or exceeded are very disadvantageous. In fact, a marking printed with said ink disappears when the transition temperature is reached and this fact does not allow to send clear and accurate information or messages to the patient/user as to whether or not said temperature is reached.

Accordingly, the inventor has addressed the problem of providing a packaging material for a pharmaceutical product which overcomes the aforesaid drawbacks.

In particular, the inventor has addressed the problem of providing a packaging material for a pharmaceutical product which is able to indicate to a patient/user if she/he has a fever in a simpler and more discrete way with respect to the above known solution and using a marking able to send clear messages to the patient/user as to whether or not a temperature is reached.

During the course of the present description and in the claims the expression:

"packaging material" is used to indicate any container, any label, any tag or any paper present in the packaging of a pharmaceutical product. The expression "packaging material" is used here to indicate also any other type of material which accompanies a pharmaceutical product as distributed, presented and/or sold by the manufacturing company. Typical containers according to the present invention are cases, boxes, medicinal bottles, phials, blister packs, sachets and the like;

"marking" is used to indicate any design, figure, letter of the alphabet, word, number, symbol, logo and any combination thereof. Typically, this marking indicates to the operator and/or the patient/user, a piece of information, a warning, a message or an alarm condition;

"visible" is used to indicate that a marking can be clearly distinguished by the human eye when viewed by a normally attentive person. On the other hand, the term "invisible" is used to indicate that a marking cannot be clearly distinguished by the human eye when viewed by a normally attentive person;

"about 38° C." indicates a temperature of 38° C.±0.5° C.; and

"conventional ink" is used to indicate an ink which, in a temperature range of between 30° C. and 45° C., does not undergo changes in colour which are visible to the human eye when viewed by a normally attentive person and which does not change from a colourless state to a coloured state or vice versa.

According to a first aspect thereof, the present invention relates to a packaging material for a pharmaceutical product having a coloured element which at about 38° C. discolours partially, revealing a marking, wherein:

(a) said element is formed by a first portion, which forms said marking printed with a conventional ink, and by a second portion printed with a thermochromic ink;

(b) said thermochromic ink is coloured below about 38° C. and becomes colourless when said temperature is reached or exceeded; and (c) said first portion and second portion are arranged so that said first portion is invisible below about 38° C., but becomes visible when said temperature is reached or exceeded.

The abovementioned expression "discolours partially" with reference to the abovementioned coloured element is intended to mean that only the first portion, and not the second portion, discolours.

Preferably, said thermochromic ink is of the reversible type, i.e. it returns to the coloured state when the temperature falls below about 38° C.

In a first preferred embodiment of the packaging material according to the present invention, said second portion is superimposed on the first portion.

In a second preferred embodiment of the packaging material according to the present invention, said first portion and second portion of said coloured element are situated alongside each other.

Preferably, when the first portion has spaces without conventional ink, the second portion of the coloured element also covers said spaces.

Preferably, in this second embodiment, the colour of the thermochromic ink is, below about 38° C., quite similar to that of the conventional ink.

Even more preferably, the colour of the thermochromic ink is, below about 38° C., as similar as possible to that of the conventional ink.

Preferably, said pharmaceutical product is an antipyretic drug.

According to a second aspect thereof, the present invention relates to a method for producing a packaging material for a pharmaceutical product having a coloured element which at about 38° C. discolours partially, revealing a marking, the production of said coloured element comprising the following steps:

a) obtaining a packaging material;
b) printing said marking thereon using an ink of the conventional type;
c) applying a thermochromic ink, which is coloured below the temperature of about 38° C., but becomes colourless when said temperature is reached, so that said marking is substantially invisible below said temperature, but becomes visible when said temperature is reached or exceeded.

Preferably the thermochromic ink is of the reversible type, i.e. it returns to the coloured state when the temperature falls below about 38° C.

In a first preferred embodiment of the method according to the present invention, said thermochromic ink forms a layer which is superimposed on the marking.

In a second preferred embodiment of the method according to the present invention, said thermochromic ink is applied so as to form a layer which is situated alongside said marking.

Preferably, when the marking has spaces without conventional ink, said spaces are also covered by a layer of thermochromic ink.

Preferably, in this second embodiment, the colour of the thermochromic ink is, below about 38° C., quite similar to that of the conventional ink with which the marking has been printed.

Even more preferably, the colour of the thermochromic ink is, below about 38° C., as similar as possible to that of the conventional ink with which the marking has been printed.

BRIEF DESCRIPTION OF THE DRAWINGS

The present invention will now be further illustrated with reference to the accompanying drawings provided by way of a non-limiting example in which.

DETAILED DESCRIPTION OF PREFERRED EMBODIMENTS OF THE INVENTION

Figure 1:
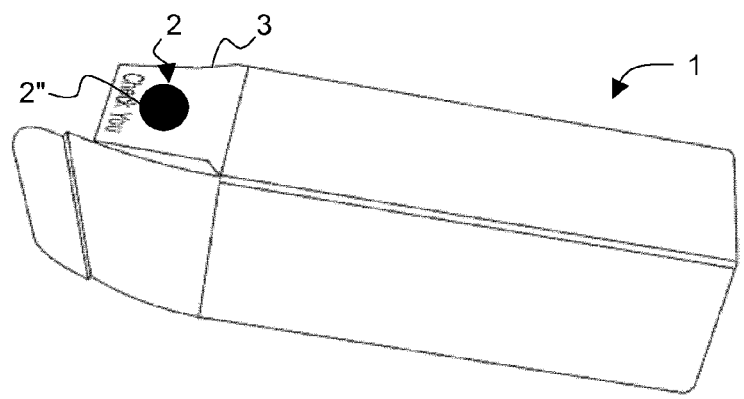
FIG. 1 is a schematic perspective view of a packaging material, according to a first preferred embodiment of the present invention, in which the temperature of the coloured element is lower than about 38° C.
Figure 2:
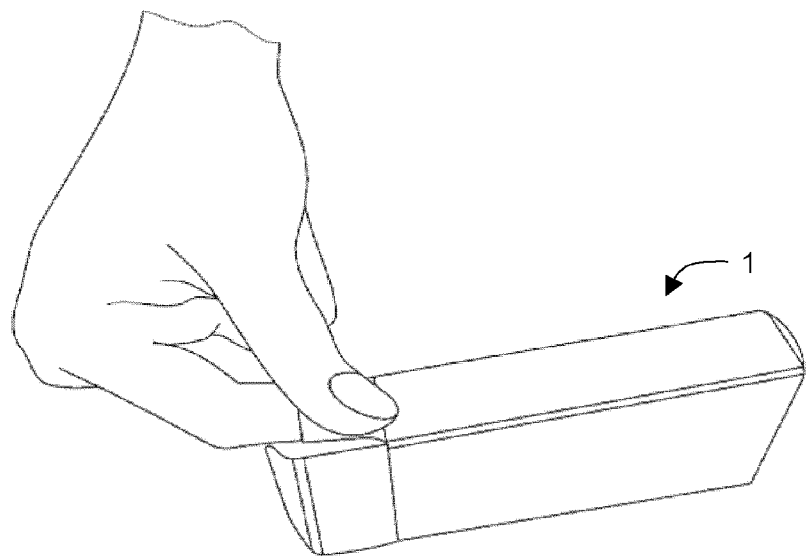
FIG. 2 is a schematic view of the material according to FIG. 1, in which a feverish patient/user presses his thumb onto the coloured element.
Figure 3:
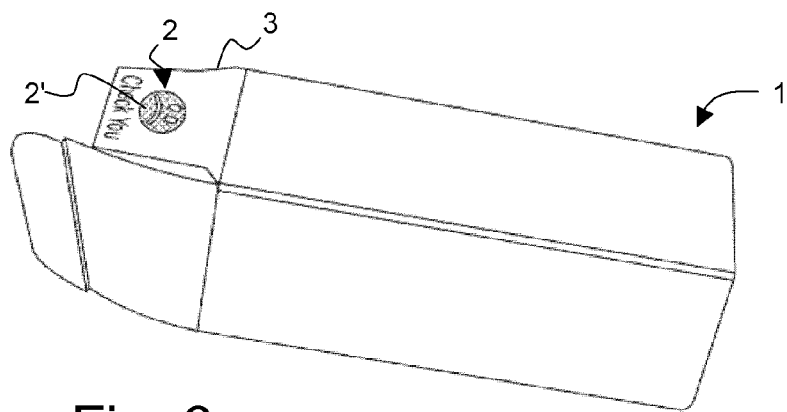
FIG. 3 is a schematic view of the material according to FIG. 1 immediately after the patient/user has moved his thumb away from the coloured element.

FIGS. 1-3 show a packaging material 1 according to a first preferred embodiment of the present invention. The packaging material 1 is a parallelepiped-shaped box containing a pharmaceutical product. Preferably, said pharmaceutical product is a drug the administration of which is useful or necessary during feverishness. More preferably, said pharmaceutical product is an antipyretic drug.

As already stated, this type of packaging material is not limiting, in that the packaging material may be a label, tag, phial, sachet, blister pack, medicinal bottle, case, powder sachet, or any other packaging material commonly used in the pharmaceutical sector. The packaging material 1 can also be any other type of material which accompanies a pharmaceutical product as distributed, presented and/or sold by the manufacturing company.

According to preferred embodiments of the present invention, a coloured element 2 is associated with the packaging material 1.

This coloured element 2 is advantageously arranged on an outer surface of an opening/closing flap 3 of the box 1 so that it is easier to hold it for a feverish patient/user who has to exert a certain pressure with his thumb onto the coloured element (FIG. 2).

Preferably, this coloured element 2 comprises a conventional red ink and a thermochromic ink which changes from red to a colourless state at about 38° C. Preferably, the change of colour of said thermochromic ink is reversible since its colour becomes red again when the temperature falls below said temperature.

More particularly, said conventional ink preferably forms a marking 2' consisting of a picture of a painstricken face and said thermochromic ink forms a layer 2" superimposed on the marking 2'.

When the temperature of the element 2 is less than about 38° C., the layer 2" of said thermochromic ink fully covers and renders the marking 2' invisible (FIG. 1).

However, when the temperature of the element 2 is equal to, or greater than, 38° C. the layer 2" of said thermochromic ink preferably becomes colourless and renders said marking 2' visible (FIG. 3).

Therefore, the appearance of the marking 2' informs the patient/user that he has really a fever and that he needs to be administered with the antipyretic drug contained in the box 1.

Alternatively, in place of consisting of a picture of a painstricken face, the marking 2' can consist of any other picture, symbol or word capable of instructing the patient/user that his body temperature is of about 38° C. For instance, the marking 2' may simply consist of the symbol "38° C.".

Figure 4:
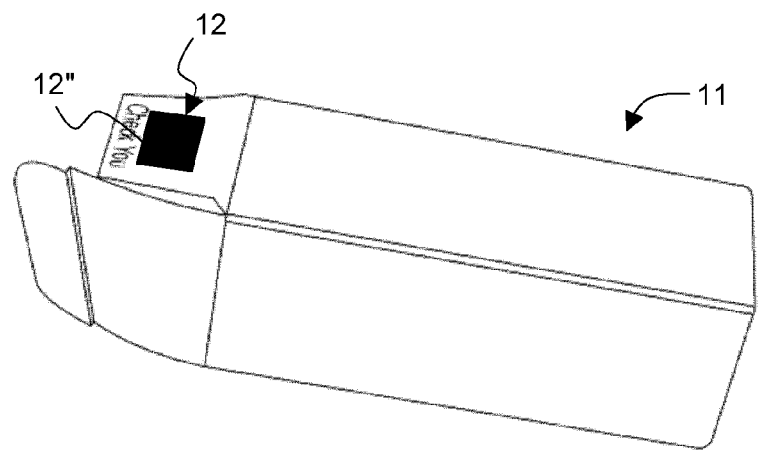
FIG. 4 is a schematic perspective view of a packaging material according to a second preferred embodiment of the present invention, in which the temperature of the coloured element is lower than about 38° C.
Figure 5:
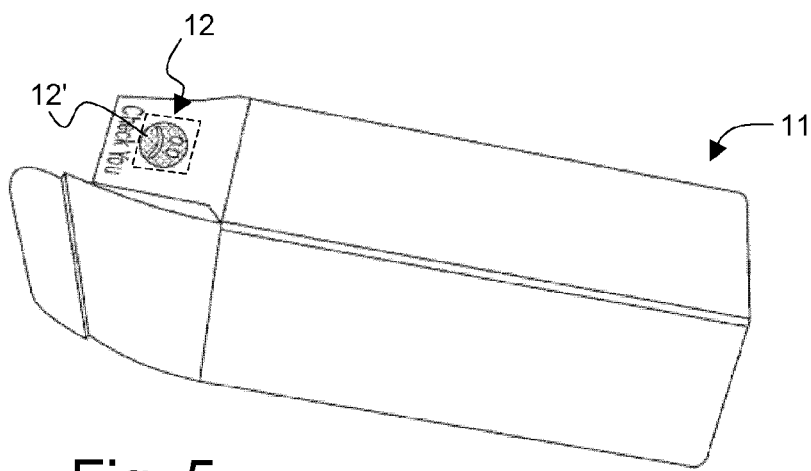
FIG. 5 is a schematic view of the material according to FIG. 4, in which the temperature of the coloured element is equal to or greater than about 38° C.

FIGS. 4 and 5 show a packaging material 11 according to a second preferred embodiment of the present invention.

This packaging material 11 differs from that of FIG. 1-3 primarily in that the thermochromic ink forms a layer 12" which surrounds and is situated alongside the marking 12' and fills the spaces without conventional ink (i.e. eyes and mouth) so as to form the coloured element 12 where the marking 12' is invisible as long as the temperature of the packaging material 1 is less than said predetermined temperature (FIG. 4).

In the embodiment of FIG. 4 a thermochromic ink was used whose colour was, below about 38° C., substantially equal to that of the conventional ink with which the marking 12' had been printed so as to substantially render the marking 12' invisible.

Finally, FIG. 5 shows the marking 12' as it appears after the thumb of a feverish patient has pressed the element 12.

Examples of suitable thermochromic inks according to preferred embodiments of the present invention are those described in U.S. Pat. No. 4,385,844.

Other suitable thermochromic inks according to preferred embodiments of the present invention are the offset inks DYNACOLOR™ produced by the company C.T.I (Chromatic Technologies Incorporated), Colorado Springs, U.S.A. Said inks are described by the U.S. Pat. Nos. 5,591,255 and 5,997,849.

Other suitable thermochromic inks according to preferred embodiments of the present invention are the inks produced by the company SICPA SA, Prilly, Switzerland.

According to preferred embodiments of the present invention, the printing techniques are silk-screen printing and flexographic printing.

Although the packaging material of preferred embodiments of the present invention has been illustrated further above with particular reference to a packaging for an antipyretic drug, it is clear that it can also advantageously be used in connection with any other pharmaceutical product to be administered during feverishness.

The invention claimed is:

1. A packaging material comprising a colored element which at about 38° C. discolors partially, revealing a marking, wherein:
   (a) the colored element comprises a first portion, which forms the marking printed with a conventional ink, and a second portion printed with a thermochromic ink;
   (b) the thermochromic ink is colored below about 38° C. and becomes colorless when 38° C. is reached or exceeded;
   (c) the first portion and second portion are arranged so that the first portion is invisible below about 38° C., but becomes visible when 38° C. is reached or exceeded, wherein said first portion and said second portion are arranged such that said first portion and said second portion are arranged such that at least a part of the first portion and second portion of the colored element are situated alongside each other wherein when the first portion has spaces without conventional ink, the second portion of the colored element also covers the paces and the color of the thermochromic ink is, below about 38° C., as similar as possible to that of the conventional ink; and
   (d) the packaging material is suitable for a pharmaceutical product.

2. The packaging material of claim 1, wherein at least a part of the thermochromic ink is reversible.

3. The packaging material of claim 1, wherein the pharmaceutical product is an antipyretic drug.

4. A method of producing the packaging material of claim 1, comprising:
   (a) printing marking on the packaging material with a conventional ink;
   (b) applying, at least upon the marking, a thermochromic ink, which is colored below the temperature of about 38° C., but becomes colorless when the temperature is reached, so that the marking is substantially invisible below the temperature, but becomes visible when the temperature is reached or exceeded.

5. The method of claim 4, wherein the thermochromic ink is reversible.

6. The method of claim 4, wherein the thermochromic ink forms a layer which is superimposed on the marking.

7. The method of claim 4, wherein said packaging material is a box of a pharmaceutical product or a paper present in the packaging of a pharmaceutical product.

8. The packaging material of claim 1, wherein said colored element is on a surface of an opening/closing flap of the packaging material.

9. The packaging material of claim 1, wherein said colored element is configured for being pressed by a thumb of a user.

10. The packaging material of claim 1, wherein said colored element is configured for being pressed between a thumb and another finger of a user.

11. The packaging material of claim 1, wherein the packaging material is a box of a pharmaceutical product or a paper present in the packaging of a pharmaceutical product.

* * * * *